United States Patent
Narula et al.

(10) Patent No.: US 11,240,110 B1
(45) Date of Patent: Feb. 1, 2022

(54) PROVIDING SECURE DATA REPLICATION AMONG NODES OF A HIERARCHICAL MULTITENANT SECURITY ORCHESTRATION AND AUTOMATED RESPONSE (SOAR) ARCHITECTURE

(71) Applicant: Fortinet, Inc., Sunnyvale, CA (US)

(72) Inventors: Abhishek Narula, Pune (IN); Alok Agarwal, Pune (IN); Pooja Singh, Pune (IN); Satish Mishra, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 17/139,628

(22) Filed: Dec. 31, 2020

(51) Int. Cl.
*G06F 15/173* (2006.01)
*H04L 12/24* (2006.01)

(52) U.S. Cl.
CPC .......... *H04L 41/0893* (2013.01); *H04L 41/12* (2013.01); *H04L 41/18* (2013.01); *H04L 41/5064* (2013.01)

(58) Field of Classification Search
CPC ..... H04L 41/0893; H04L 41/12; H04L 41/18; H04L 41/5064
See application file for complete search history.

(56) References Cited

U.S. PATENT DOCUMENTS

2020/0259847 A1* 8/2020 Loomis ............... H04L 63/1416

* cited by examiner

*Primary Examiner* — Wing F Chan
*Assistant Examiner* — Joseph R Maniwang
(74) *Attorney, Agent, or Firm* — HDC Intellectual Property Law, LLP

(57) ABSTRACT

Systems and methods for facilitating secure and reliable communications among nodes of different tiers of a multi-tenant SOAR deployment are provided. According to one embodiment, data flow propagation within a hierarchy of nodes of the SOAR deployment is controlled. Responsive to creation of a record by a node: (i) when there exists a parent node in the hierarchy, setting a PID of the record to a TID of the parent node; otherwise, to a TID of the node; (ii) when there exists a child node in the hierarchy, setting a CID of the record to the TID of the child node; otherwise, to the TID of the node; and (iii) maintaining a set of propagation rules for the node relating to permissibility of propagation of the record within the hierarchy. During propagation of the record by the node, the PID and the CID of the record are updated.

21 Claims, 9 Drawing Sheets

PROVIDING SECURE DATA REPLICATION AMONG NODES OF A HIERARCHICAL MULTITENANT SECURITY ORCHESTRATION AND AUTOMATED RESPONSE (SOAR) ARCHITECTURE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present disclosure generally relate to security orchestration and automated response (SOAR) platforms. In particular, embodiments of the present disclosure relate to providing a hierarchical multitenant SOAR deployment model, which supports, among other use cases, both (i) customers of a Managed Security Service Provider (MSSP) to act as resellers; and (ii) MSSP customers having a geographically distributed Security Operations Center (SOC).

Description of the Related Art

Cybercrime is a serious and rapidly growing threat. Companies with computer assets on a network exposed to the Internet are at risk of being victimized by cyber criminals resulting in what could become a major data breach compromising their own data and that of their customers. When breaches like these occur, they have a significant negative impact on a business' bottom line and future earnings potential. The mitigation of such adverse consequences from cyberthreats has led to the emergence of managed security services providers (MSSPs) that provide a centralized service to multiple separate and independent clients. With the emergence of MSSPs, has surfaced the need to provide tailored, separate and segmented security service to end-users as well as multiple tiers in the management.

SUMMARY

Systems and methods are described for facilitating secure and reliable communications among nodes of different tiers of a multi-tenant SOAR deployment. According to one embodiment, data flow propagation within a hierarchy of multiple SOAR nodes of a SOAR deployment is controlled. Each particular SOAR node of the multiple SOAR nodes has a tenant identifier (ID) that uniquely identifies the particular SOAR node within the SOAR deployment. The controlling of the data flow propagation includes responsive to creation of a record by the SOAR node: (i) when there exists a parent tier immediately above the SOAR node in the hierarchy, setting a parent-tenant ID (PID) of the record to the tenant ID of a parent SOAR node of the multiple SOAR nodes associated with the parent tier; otherwise, setting the PID to the tenant ID of the SOAR node; (ii) when there exists a child tier immediately below the SOAR node in the hierarchy, setting a child-tenant ID (CID) of the record to the tenant ID of a child SOAR node of the multiple SOAR nodes associated with the child tier; otherwise, setting the CID to the tenant ID of the SOAR node; and (iii) maintaining a set of propagation rules for the SOAR node relating to permissibility of propagation of the record within the hierarchy. During propagation of the record by the SOAR node, the PID and the CID of the record are updated.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
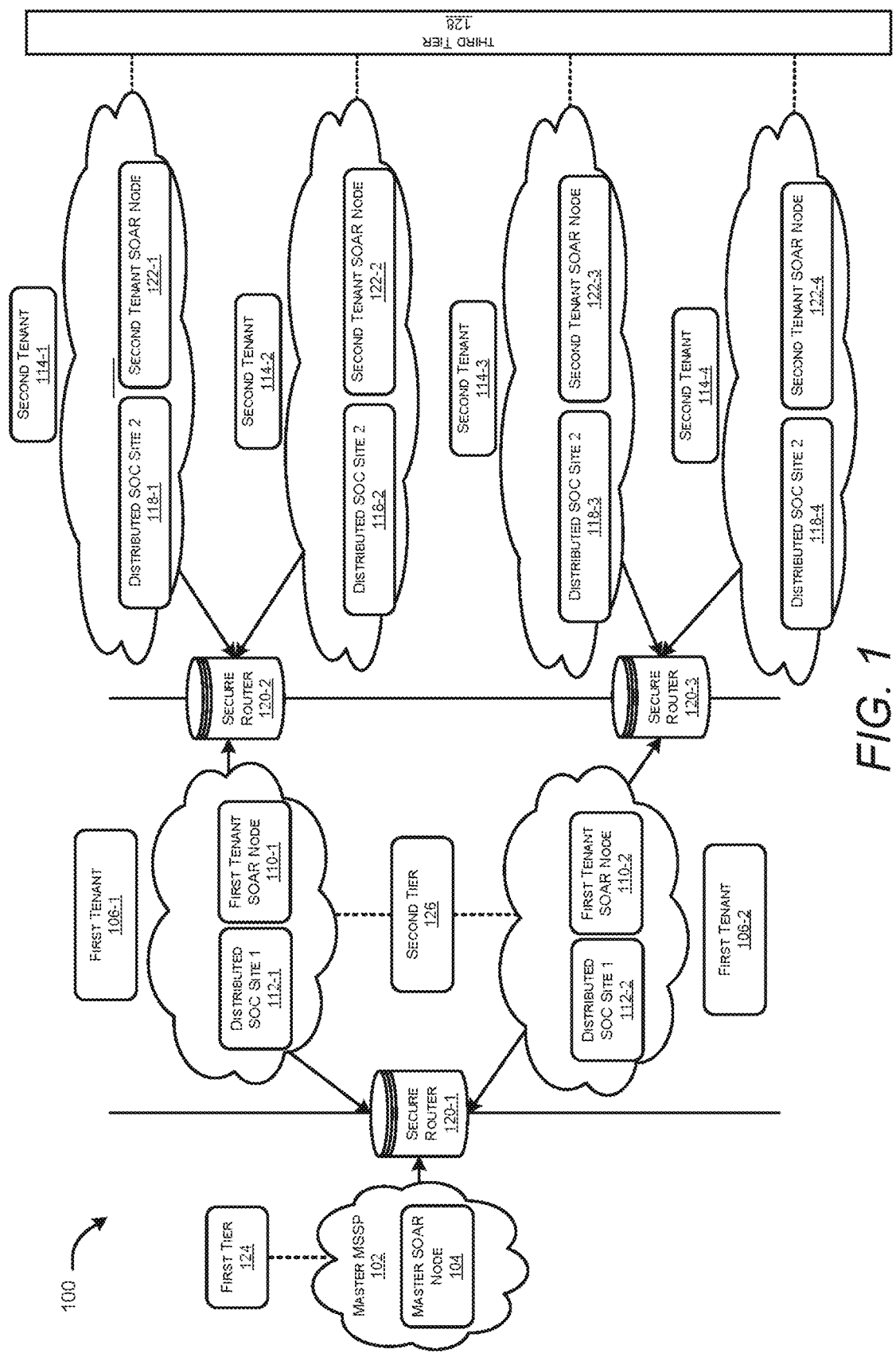
FIG. 1 conceptually illustrates an example network architecture for a hierarchical multi-tier SOAR deployment in accordance with an embodiment of the present disclosure.

Systems and methods are described for facilitating secure and reliable communications among nodes of different tiers of a multi-tenant SOAR deployment. Selective data replication in the context of a two-tier SOAR deployment is described in U.S. patent application Ser. No. 16/784,048, filed on Feb. 6, 2020, which is hereby incorporated by reference in its entirety for all purposes.

There is a need for a hierarchical multitier deployment of a SOAR platform, for example, having more than two tiers, to support, among other scenarios (a) the ability of MSSP customers to operate as resellers; and (b) large organizations having a globally distributed SOC. Such a hierarchical multitier SOAR deployment should also provide the ability for each tenant client node available at a particular tier to be able to operate as a standalone instance with full capabilities and be used independently. Also, each of the tenant client nodes should support (i) selective replication of incident data from the tenant child node to a parent node within a parent tier and maintain bidirectional synchronization of relevant data; (ii) execution of workflow instructions issued from the parent tier and sending back of results, and (iii) allowing/disallowing of remote configuration management (e.g., installation of add-ons, creation of playbooks, customization of incident definitions by adding new attributes, and the like) for a more seamless management from the parent tier the child tier in appropriate circumstances (e.g., when the tenant at the child tier desires configuration to be managed on its behalf by the parent tier).

Among the many hurdles relating to implementation of a hierarchical multitier SOAR deployment, include the fact that the tiers should be in different network segments and the nodes operating within different tiers have their own respective maintenance cycles and other network nuances. Because the multiple tiers will be in different network segments, setting up a Virtual Private Networking (VPN) connection between them is not always feasible or desirable. In addition, due to the potential for message loss, the model used for communication among the nodes should handle network disconnects and guarantees message delivery. As described in further detail below, various embodiments of the present disclosure seek to, among other things, govern the data flow amongst the various tiers of a hierarchical multitier SOAR deployment, maintain bidirectional synchronization, and prevent infinite looping while maintaining the bidirectional synchronization.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This disclosure may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

According to various embodiments of the present disclosure, a hierarchy of multiple secure orchestration and automated response (SOAR) nodes of a SOAR deployment is supported. The hierarchy includes multiple tiers; and, in some embodiments, the multiple tiers include at least three tiers. Each respective SOAR node of the multiple SOAR nodes has a tenant identifier (ID). Data flow propagation within the hierarchy is controlled by maintaining within a record created by a particular SOAR node (i) a parent-tenant ID (PID) specifying the tenant ID of a parent SOAR node to the particular SOAR node and (ii) a child-tenant ID (CID), specifying the tenant ID of a child SOAR node to the particular SOAR node. The data flow propagation within the hierarchy is controlled by maintaining a set of propagation rules for the particular SOAR node relating to permissibility of upward or downward propagation of the record within the hierarchy.

FIG. 1 conceptually illustrates an example network architecture 100 for a hierarchical multi-tier SOAR deployment in accordance with an embodiment of the present disclosure. In the context of the present example, a hierarchy of multiple SOAR nodes (e.g., master SOAR node 104 (which may at times be referred to herein as simply the master node), first tenant SOAR nodes (110-1, 110-2) (which may at times be referred to herein as simply the first tenant node), second tenant SOAR nodes (122-1, 122-2, 122-3, 122-4) (which may at times be referred to herein as simply the second tenant node)) of the SOAR deployment is supported. The hierarchy includes multiple tiers. In the context of the present example, the multiple tiers include at least three tiers (e.g., first tier 124, second tier 126, and third tier 128). Each respective SOAR node of the multiple SOAR nodes has a tenant ID (e.g., a self-tenant ID (SID) which may be used herein interchangeably) that uniquely identifies each SOAR node of the multiple SOAR nodes.

A SOAR node in a particular tier may be connected to a SOAR node of another tier above and/or below the particular tier and may communicate bi-directionally through secure routers 120-1, 120-2, 120-3 (which may at times be referred to herein as simply the router). As described further below, infinite looping of replicated data is prevented while maintaining bi-directional synchronization of the replicated data by maintaining in the replicated records information regarding a parent-tenant ID and a child-tenant ID as the replicated records are propagated up or down the tiers of the multi-tenant SOAR deployment.

In one embodiment, data flow propagation within the hierarchy is performed by maintaining within each record of multiple records associated with the SOAR deployment a parent-tenant ID and a child-tenant ID. Further, a set of propagation rules are maintained by each SOAR node relating to permissibility of upward or downward propagation of records between tiers of the hierarchical multi-tier SOAR deployment.

In the context of the present example, a first tier 124 of the SOAR deployment represents a master managed security service provider (MSSP) 102 and includes a master SOAR node 104. First tenants (106-1, 106-2) of the SOAR deployment are associated with a second tier 126. Each of the first tenants (106-1, 106-2) respectively include a first tenant SOAR node (110-1, 110-2). Further, second tenants (114-1, 114-2, 114-3, 114-4) of the SOAR deployment are associated with a third tier 128 having respectively a second tenant SOAR node (122-1, 122-2, 122-3, 122-4). Master SOAR node 104 is a parent of first tenant SOAR nodes (110-1, 110-2) and first tenant SOAR nodes (110-1, 110-2) are parent of second tenant SOAR nodes (122-1, 122-2, 122-3, 122-4), respectively.

In the context of the present example, first tenant 106-1 includes a second tier of a distributed Security Operations Center (SOC) (112-1) of a large organization 102 and so on. Each second tenant (114-1, 114-2, 114-3, and 114-4) includes a respective second site of a distributed SOC (118-1, 118-2, 118-3, and 118-4). In alternative embodiments, first tenants (106-1, 106-2) may respectively include one or more MSSPs (108-1, 108-2) operating as resellers of services provided by the SOAR deployment and second tenants (114-1, 114-2, 114-3, and 114-4) may be customers (116-1, 116-2, 116-3, and 116-4) of respective reseller (108-1, 108-2). Those skilled in the art will appreciate the first tenant SOAR node may act as (i) an MSSP customer that operates as a reseller of services, and/or as (ii) a distributed SOC site of an organization. These use cases may be implemented and used as two parallel use cases for the first tenant SOAR node of the hierarchical multi-tier SOAR deployment. As such, an instance of the first tenant SOAR node may act either as an MS SP reseller or as a site of distributed SOC of an organization.

In the context of the present example, changes to a particular record of multiple records containing incident data are selectively propagated downward through the hierarchy until the child-tenant ID of the particular record is equal to the parent-tenant ID of the particular record or until the set of propagation rules for a recipient of the particular record prohibits the propagation. During upward propagation of a record received from a child SOAR node, the parent-tenant ID of the record is changed to the child-tenant ID, and during the downward propagation of the record received from the parent SOAR node, the child-tenant ID of the record is changed to the parent-tenant ID.

Figure 2:
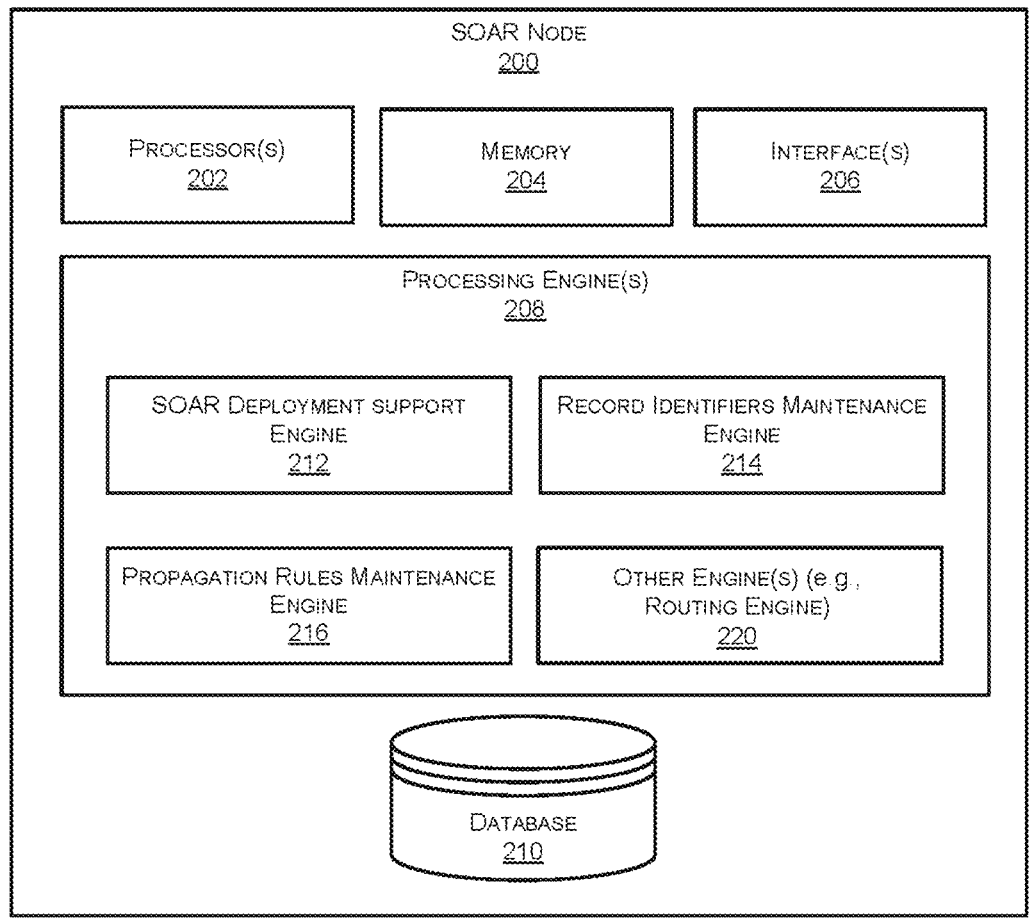
FIG. 2 is a block diagram illustrating functional components of SOAR node in accordance with an embodiment of the present disclosure.

FIG. 2 is a block diagram illustrating functional components of SOAR node 200 in accordance with an embodiment of the present disclosure. In the context of the present example, SOAR node 200 may include one or more processor(s) 202. Processor(s) 202 may be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of SOAR node 200. Memory 204 may store one or more computer-readable instructions or routines, which may be fetched and executed to create or share the data units over a network service. Memory 204 may include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

SOAR node 200 may also include one or more Interface(s) 206. Interface(s) 206 may include a variety of interfaces, for example, interfaces for data input and output devices, referred to as I/O devices, storage devices, and the like. Interface(s) 206 may facilitate communication of SOAR node 200 with various devices coupled to SOAR node 200. Interface(s) 206 may also provide a communication pathway for one or more components of SOAR node 200. Examples of such components include, but are not limited to, processing engine(s) 208 and database 210.

Processing engine(s) 208 may be implemented as a combination of hardware and software or firmware programming (for example, programmable instructions) to implement one or more functionalities of resource(s) may. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s)

208. In such examples, SOAR node 200 may include the machine-readable storage medium storing the instructions and the processing engine to execute the instructions, or the machine-readable storage medium may be separate but accessible to SOAR node 200 and the processing engine. In other examples, processing engine(s) 208 may be implemented by electronic circuitry. Database 210 may include data that is either stored or generated as a result of functionalities implemented by any of the components of processing engine(s) 208.

In an example, processing engine(s) 208 may include SOAR deployment support engine 212, record identifiers maintenance engine 214, propagation rules maintenance engine 216, and other engine(s) 220. Other engine(s) 220 may implement functionalities that supplement applications or functions performed by SOAR Node 200.

According to an embodiment, SOAR deployment support engine 212 supports a hierarchy of multiple SOAR nodes of a SOAR deployment. The hierarchy includes multiple tiers. Each respective SOAR node of the multiple SOAR nodes includes a tenant ID that uniquely identifies each of the respective SOAR node of multiple SOAR nodes. The multiple tiers include a first tier representing a master MS SP and includes a master SOAR node, a second tier with which a first tenant of the SOAR deployment is associated and includes a first tenant SOAR node, and a third tier with which a second tenant of the SOAR deployment is associated and includes a second tenant SOAR node. The master SOAR node is a parent of the first tenant SOAR node and the first tenant SOAR node is a parent of the second tenant SOAR node.

The first tenant may represent an MSSP that operates as a reseller of services provided by the SOAR deployment and the second tenant may be a customer of the MSSP. In an embodiment, the first tenant may alternatively represent a first site of a distributed SOC of a customer of the master MSSP and the second tenant may include a second site of the distributed SOC.

According to an embodiment, for controlling data flow propagation, record identifiers maintenance engine 214 maintains within each record of multiple records associated with the SOAR deployment a parent-tenant ID specifying the tenant ID of the parent SOAR node (if any) and a child-tenant ID specifying the tenant ID of the child SOAR node (if any).

According to an embodiment, for controlling the data flow propagation, propagation rules maintenance engine 216 maintains a set of propagation rules for each of the multiple SOAR nodes relating to permissibility of upward or downward propagation of a record received from a child SOAR node or a parent SOAR node, respectively. In an embodiment, for the data propagation, changes are selectively propagated to a particular record of multiple records containing incident data downward through the hierarchy until the child-tenant ID of the particular record is equal to the parent-tenant ID of the particular record or until the set of propagation rules for a recipient of the particular record prohibits the selective propagating.

During upward propagation of the record received from the child SOAR node, the parent-tenant ID of the record is changed to the child-tenant ID, and during the downward propagation of the record received from the parent SOAR node, the child-tenant ID of the record is changed to the parent-tenant ID.

The various functional components, engines, and modules (e.g., the SOAR deployment support engine 212, the record identifiers maintenance engine 214, and the propagation rules maintenance engine 216) and other functional units described herein and the processing described below with reference to the flow diagrams of FIGS. 3A-B and 4-7 may be implemented in the form of executable instructions stored on a machine readable medium and executed by one or more processing resources (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 8 below.

Figure 3A:
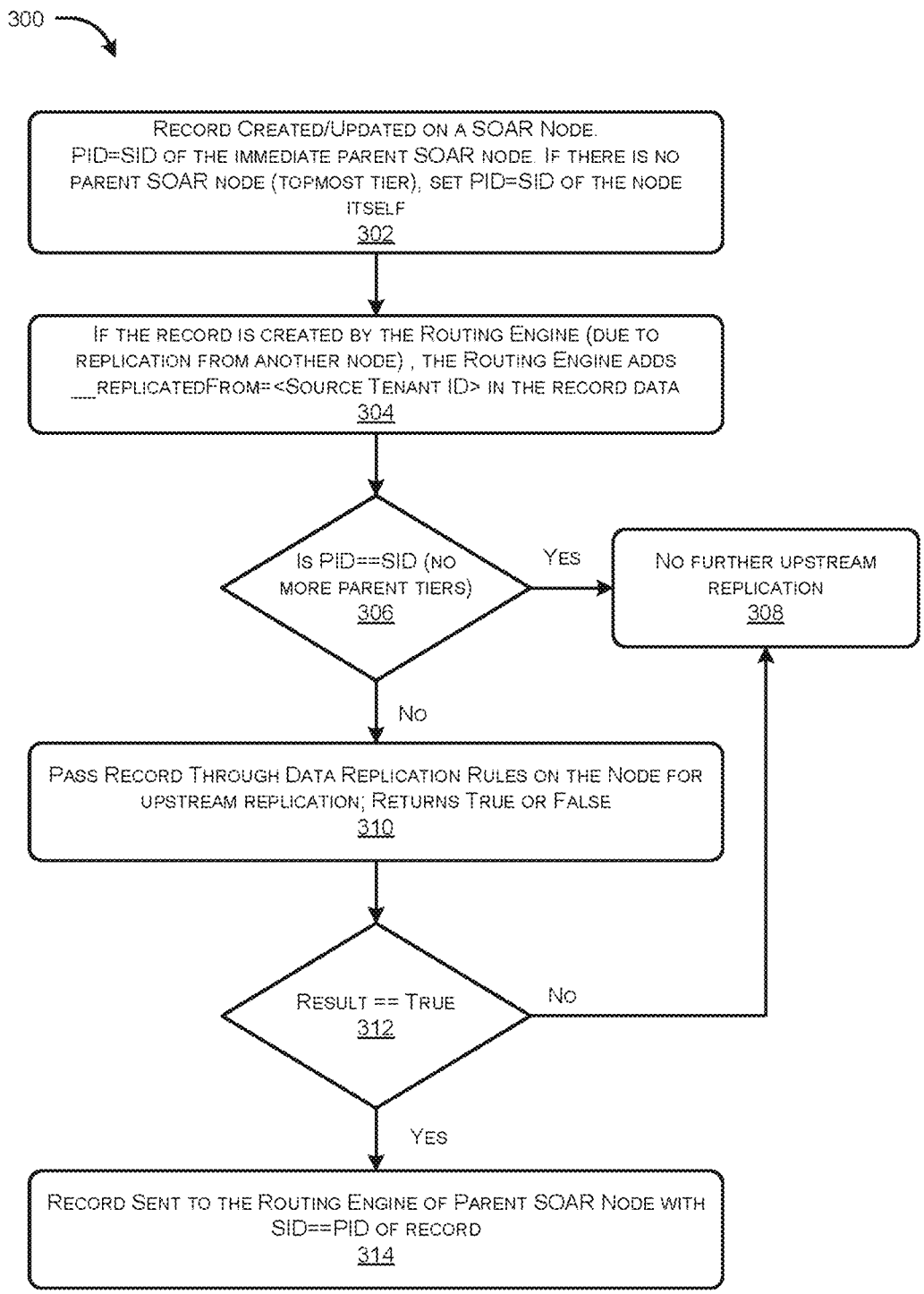
FIG. 3A is a flow diagram illustrating modification of a parent-tenant ID and a child-tenant ID of a record during upward propagation of the record in accordance with an embodiment of the present disclosure.

FIG. 3A is a flow diagram 300 illustrating an upstream replication flow of a record for a hierarchical multi-tier SOAR deployment in accordance with an embodiment of the present disclosure. The flow diagram shows an overview of a set of propagation rules for upward propagation of a record to govern data flow amongst nodes available at various tiers, maintain bidirectional synchronization of the data, and prevent infinite looping of the data while attempting to maintain bi-directional synchronization. The propagation rules may direct creation, updating, and/or deletion of the record to nth level within a hierarchy of multiple SOAR nodes of the SOAR deployment.

In an embodiment, whenever a record is created/updated on a SOAR node, a routing engine present on the SOAR node checks for replication eligibility of the record to a parent node and a child node. Upon having a replication eligibility, the record is passed onto the routing engine of the eligible parent/child node for creation/update of the record on corresponding parent/child nodes.

At block 302, when a record is created/updated on a SOAR node, the parent-tenant ID (PID) of the SOAR node is set to the self-tenant ID (SID) of an immediate parent SOAR node, if any. When there is no parent node available (i.e., the SOAR node is at a topmost tier), the PID for the record is set to the SID of the SOAR node itself.

At block 304, when the record is created by the routing engine (due to replication from another node), the replication engine may tag the record to reflect the fact that the record was created as a result of replication from another node (e.g., by adding "_replicated from=<source tenant ID>" in the record data).

At decision block 306, it is determined whether an additional parent tier is available for continued upward propagation. For example, the PID may be compared to the SID (PID SID). If the PID and the SID are equal, then no further parent tiers are available. As such, when the determination is affirmative at decision block 306, processing branches to block 308; otherwise, processing continues with block 310. In one embodiment, an additional decision block (not shown) may be performed prior to block 310 that determines whether the record was replicated from a node having an SID equal to the PID of the record. If so, then processing may branch to block 308; otherwise, processing may continue with block 310.

At block 308, no further upstream replication is possible, therefore upstream replication is complete.

At block 310, the record is passed through data replication rules on the node for upstream replication. Evaluation of the data replication rules for the record at issue may return a true value or a false value.

At decision block 312, it is determined whether the result obtained at block 310 is true or false. When the result obtained is true, processing continues with block 314; otherwise, processing branches to block 308.

At block 314, the record is sent to the routing engine of the parent SOAR node having an SID that is equal to the PID of the record and further upstream replication processing proceeds with the parent SOAR node starting at block 304.

Figure 3B:
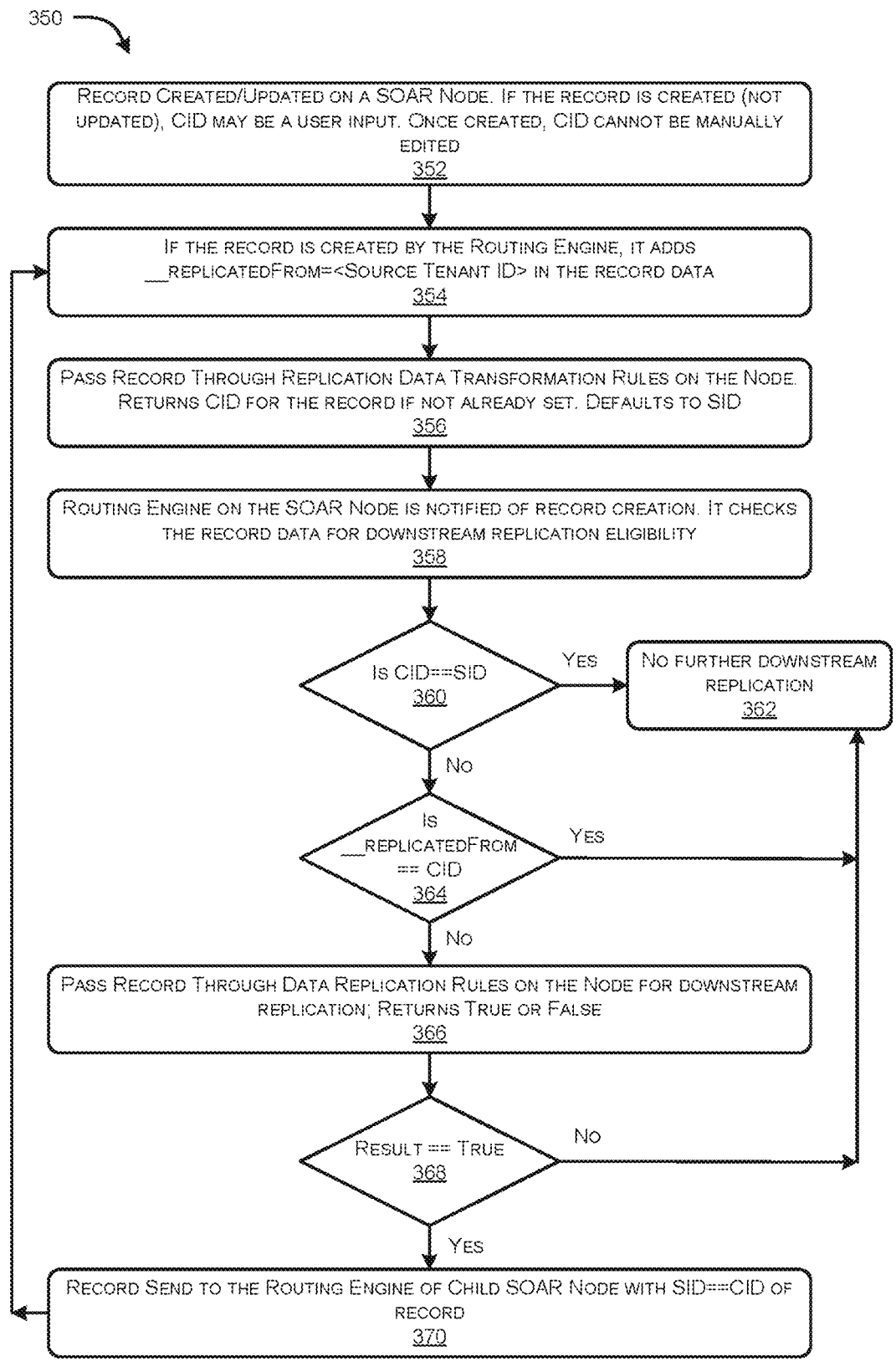
FIG. 3B is a flow diagram illustrating modification of a parent-tenant ID and a child-tenant ID of a record during downward propagation of the record in accordance with an embodiment of the present disclosure.

FIG. 3B is a flow diagram 350 illustrating a downstream replication flow of a record for a hierarchical multi-tier SOAR deployment in accordance with an embodiment of the present disclosure. At block 352, a record is created/updated on a SOAR node. According to one embodiment, when the record is created (not updated), then the child-tenant ID (CID) of the SOAR node may be a user input. Once the record is created, the CID should not be manually edited.

At block 354, when the record is created by the routing engine (due to replication from another node), the replication engine may tag the record to reflect the fact that the record was created as a result of replication from another node (e.g., by adding "_replicated from=<source tenant ID>" in the record data).

At block 356, the record is passed through replication data transformation rules applied on the node, and returns the CID for the record if it has not already been set. In one embodiment, when no CID has been set for the record, the CID may be defaulted to the SID of the current node.

At block 358, the routing engine on the SOAR node is notified of the record creation and the routing engine checks the record data for downstream replication eligibility.

At decision block 360, it is determined whether the CID of the record is equal to the SID of the current node. If so, then processing branches to block 362; otherwise, processing continues with decision block 364.

At block 362, no further downstream replication is possible, therefore downstream replication is complete.

At decision block 364, it is determined whether the record was replicated from a node having an SID equal to the CID of the record. If so, then processing branches to block 362; otherwise, processing continues with block 366.

At block 366, the record is passed through data replication rules on the node for downstream replication. Evaluation of the data replication rules for the record at issue may return a true value or a false value.

At decision block 368, it is determined whether the result obtained at block 366 is true or false. When the result obtained is true, processing continues with block 370; otherwise, processing branches to block 362.

At block 370, the record is sent to the routing engine of the child SOAR node having an SID equal to the CID of the record and further downstream replication processing proceeds with the child SOAR node starting at block 354.

In the context of the present example, in the SOAR deployment, the parent-tenant ID and the child-tenant ID of the record determined during the upward propagation and the downward propagation as per the propagation rules may be summarized as in Table 1.

TABLE 1

| Created On | Created For | On Master | On First Tenant | On Second Tenant |
|---|---|---|---|---|
| First Tenant SOAR Node | Second Tenant SOAR Node | Child-tenant ID: First Tenant SOAR Node self-tenant ID, parent-tenant ID : Master SOAR Node self-tenant ID | Child-tenant ID: Second Tenant SOAR Node self-tenant ID, parent-tenant ID : First Tenant SOAR Node self-tenant ID | Child-tenant ID: Second Tenant SOAR Node self-tenant ID, parent-tenant ID : First Tenant SOAR Node self-tenant ID |
| First Tenant SOAR Node | First Tenant SOAR Node | Child-tenant ID : First Tenant SOAR Node self-tenant ID, parent-tenant ID : Master SOAR Node self-tenant ID | Child-tenant ID : First Tenant SOAR Node self-tenant ID, parent-tenant ID : First Tenant SOAR Node self-tenant ID | Not replicated |
| Master SOAR Node | First Tenant SOAR Node | Child-tenant ID : First Tenant SOAR Node self-tenant ID, parent-tenant ID : Master SOAR Node self-tenant ID | Child-tenant ID : First Tenant SOAR Node self-tenant ID (unless a set of transformation rules set it to Second Tenant SOAR Node self-tenant ID, parent-tenant ID : Master SOAR Node self-tenant ID | Not replicated |

Figure 4:
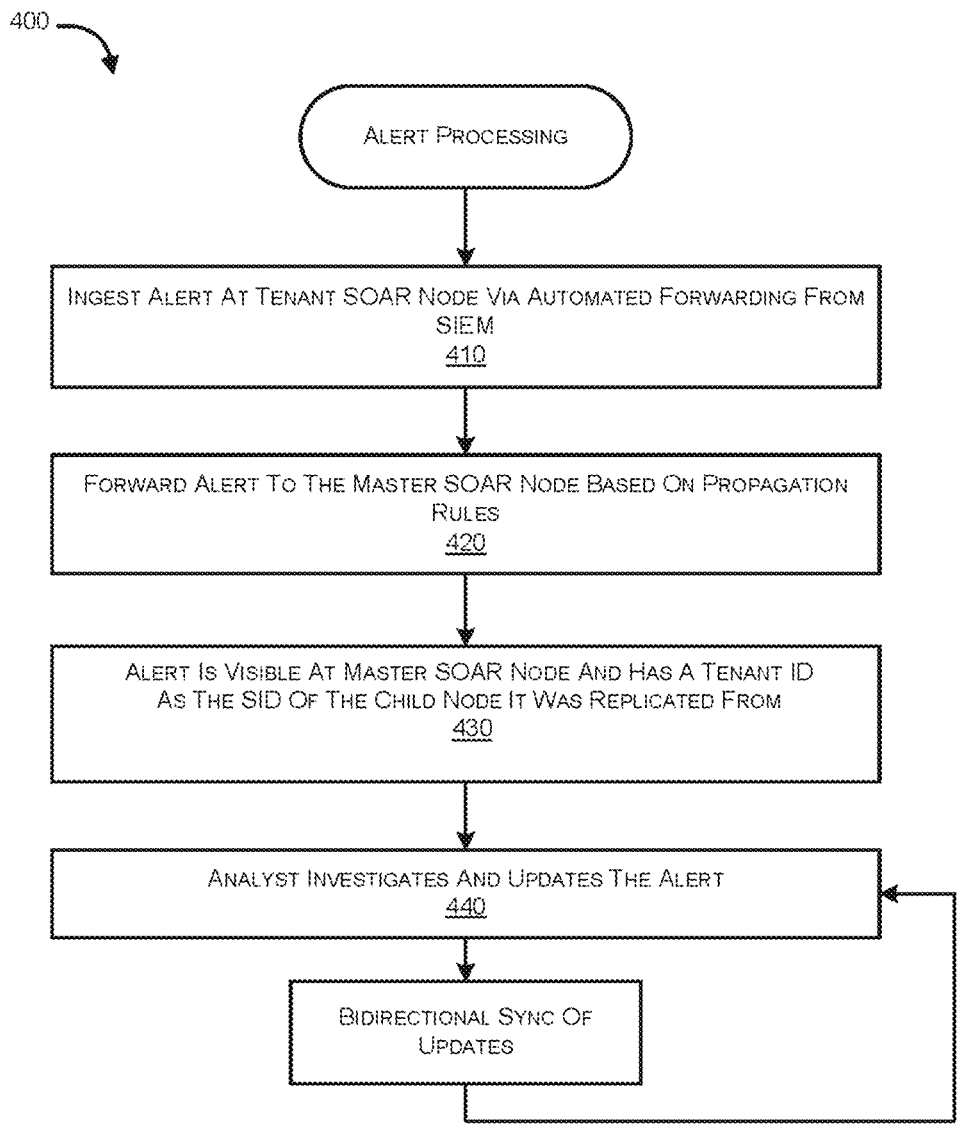
FIG. 4 is a high-level flow diagram illustrating alert processing in accordance with an embodiment of the present disclosure.

FIG. 4 is a high-level flow diagram 400 illustrating alert processing in accordance with an embodiment of the present disclosure. FIG. 4 shows a high-level overview of data flow between master SOAR node (e.g., master node 104) and its various tenant SOAR nodes available at various tiers (e.g., first tenant nodes 110-1, . . . , 110-*n*, and second tenant nodes 122-1, . . . , 122-*n*). At block 410, an alert from a Security Information Management (SIM), SIEM or IDS associated with a customer premises is ingested via Application Programming Interfaces (APIs) exposed by the tenant nodes of the customer premises. Alerts may optionally be auto-categorized and auto-enriched at the tenant nodes itself through post-create workflows defined at the tenant nodes that extract observables from the alert and fetch reputation and relevant information based on an alert type.

At block 420, the alert is forwarded to the master node based on propagation rules. According to one embodiment, based on the propagation rules the eligible alerts are auto-forwarded to the master node for further investigation.

At block 430, the alert becomes visible at the master node and has a tenant attribute (e.g., child-tenant ID). In one embodiment, every alert arriving at the master node includes a tenant attribute that identifies the tenant node from which it came, which helps service provider (e.g., MSSP 110) group the alerts by customer.

At block 440, an analyst investigates and updates the alert. For example, the service provider analyst may add notes, update status and perform other updates on the alert during the life-cycle of the alert.

At block 450, bidirectional synchronization of updates is performed. In one embodiment, all updates done to an alert at the master node are synced back to the tenant node (e.g., first tenant SOAR node and second tenant SOAR node). Additionally, any updates made to the alert from the tenant via workflows or human interaction may also be synchronized back to the master node.

Figure 5:
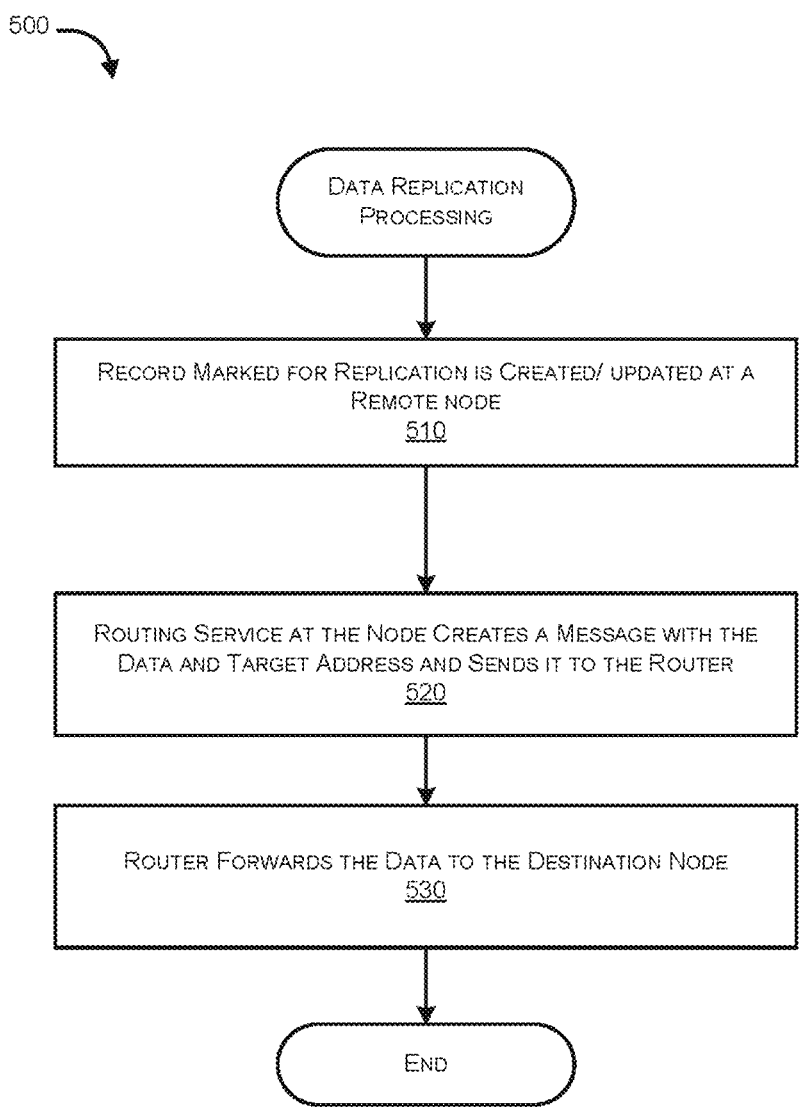
FIG. 5 is a flow diagram illustrating data replication processing in accordance with an embodiment of the present disclosure.

FIG. 5 is a flow diagram 500 illustrating data replication processing in accordance with an embodiment of the present disclosure. FIG. 5 explains the infrastructural use of a secure router as an intermediary device responsible for routing appropriate data from a master SOAR node to appropriate tenant nodes (e.g., a first tenant SOAR node, a second tenant SOAR node) and also from the tenant nodes to the master node in accordance with an embodiment. According to one embodiment, an intermediate router (e.g., secure router 120-1, 120-2, and 120-3) may be used to handle bi-directional message routing between the master SOAR node and the tenant nodes asynchronously, securely and in a guaranteed fashion. In an embodiment, the nodes do not need direct network connectivity to each other; instead, each node relies on an outbound network connectivity to the router, thereby eliminating a great deal of traditional network infrastructure overhead.

At block 510, a record marked for replication is created/updated at a remote node (e.g., the first tenant SOAR node, the second tenant SOAR node or the master SOAR node).

At block 520, when a record eligible for auto-replication is created or updated at either the master SOAR node or the tenant node SOAR node, a routing service running within the node creates a message with the data to be replicated and an address of a destination node and posts the message to the router.

At block 530, the router forwards the data to the destination node. In one embodiment, the router ensures delivery of the message to the destination node asynchronously, without the nodes having to worry about it. For example, as described further below with reference to FIG. 6 if the destination node is not online or connectivity to it is lost at the time the message arrives, the router persists the message until the destination node comes back online and picks up the messages with its addresses on them and in the correct sequence.

Figure 6:
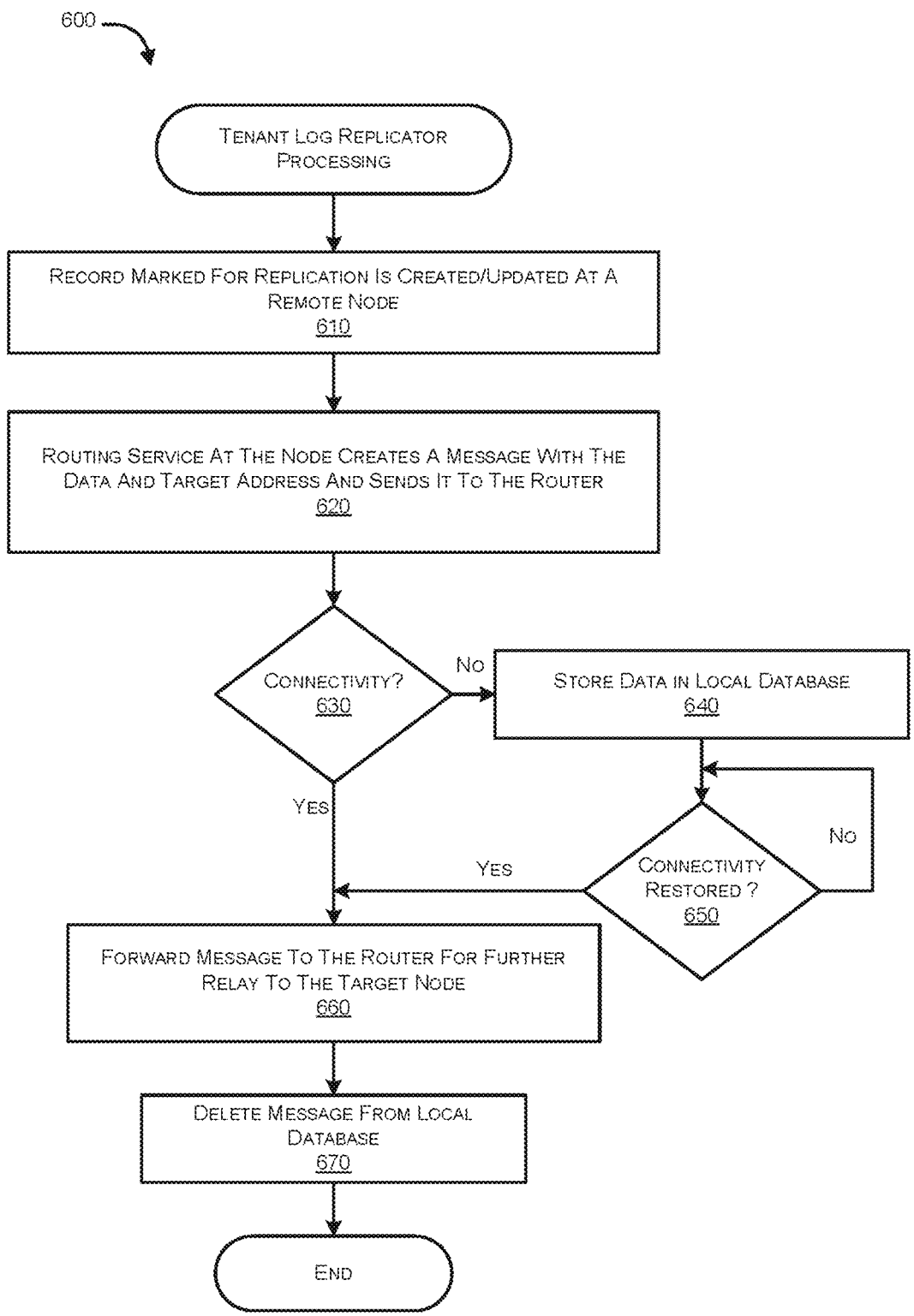
FIG. 6 is a flow diagram illustrating tenant log replicator processing in accordance with an embodiment of the present disclosure.

FIG. 6 is a flow diagram 600 illustrating tenant log replicator processing in accordance with an embodiment of the present disclosure. In the context of the present example, a local log replicator located at a tenant SOAR node (e.g., a first tenant SOAR node or a second tenant SOAR node) continues to aggregate log data in an event of connectivity disruption between any of the participating nodes and the secure router. The use of a local replicator log database at each of the nodes in accordance with an embodiment guarantees the delivery of messages.

At block 610, a record marked for replication is created/updated at a remote node (e.g., a first tenant SOAR node, a second tenant SOAR node or a master SOAR node).

At bock 620, when a record eligible for auto-replication is created at the tenant node, a message with a copy of the updates is prepared by a routing service to be delivered to the master node (or from the master SOAR node to the tenant SOAR node if the record is updated at the master SOAR node). The routing service posts this message to the router with an address of a destination node.

At decision block 630, it is determined if there is connectivity from the remote node to the router. If so, then processing continues with block 660; otherwise, processing branches to block 640. For example, if the network connectivity of the remote node is broken due to a network glitch, planned maintenance or the like, the message delivery should be reattempted to keep the data at both the remote node and the destination node in sync.

At block 640, the data is stored in a local database. For example, the routing service at each node of a SOAR deployment may maintain a local replicator log and any message that cannot be delivered to the router due to connectivity loss may be stored in the replicator log.

At decision block 650, a determination is made if connectivity has been restored. If so, then processing continues with block 660; otherwise processing loops back to decision block 650. For example, the remote node keeps trying to re-connect to the secure router and as soon as the connectivity is restored, the log is replayed at block 660. In one embodiment, in order to maintain the sequence of message delivery, any new message arriving for replication should be sent forward until the backlog is cleared; hence such new messages will also be written to the replicator log if replay is on.

At block 660, the message is forwarded to the router for further relay to the destination node.

At block 670, the message is deleted from the local database.

Figure 7:
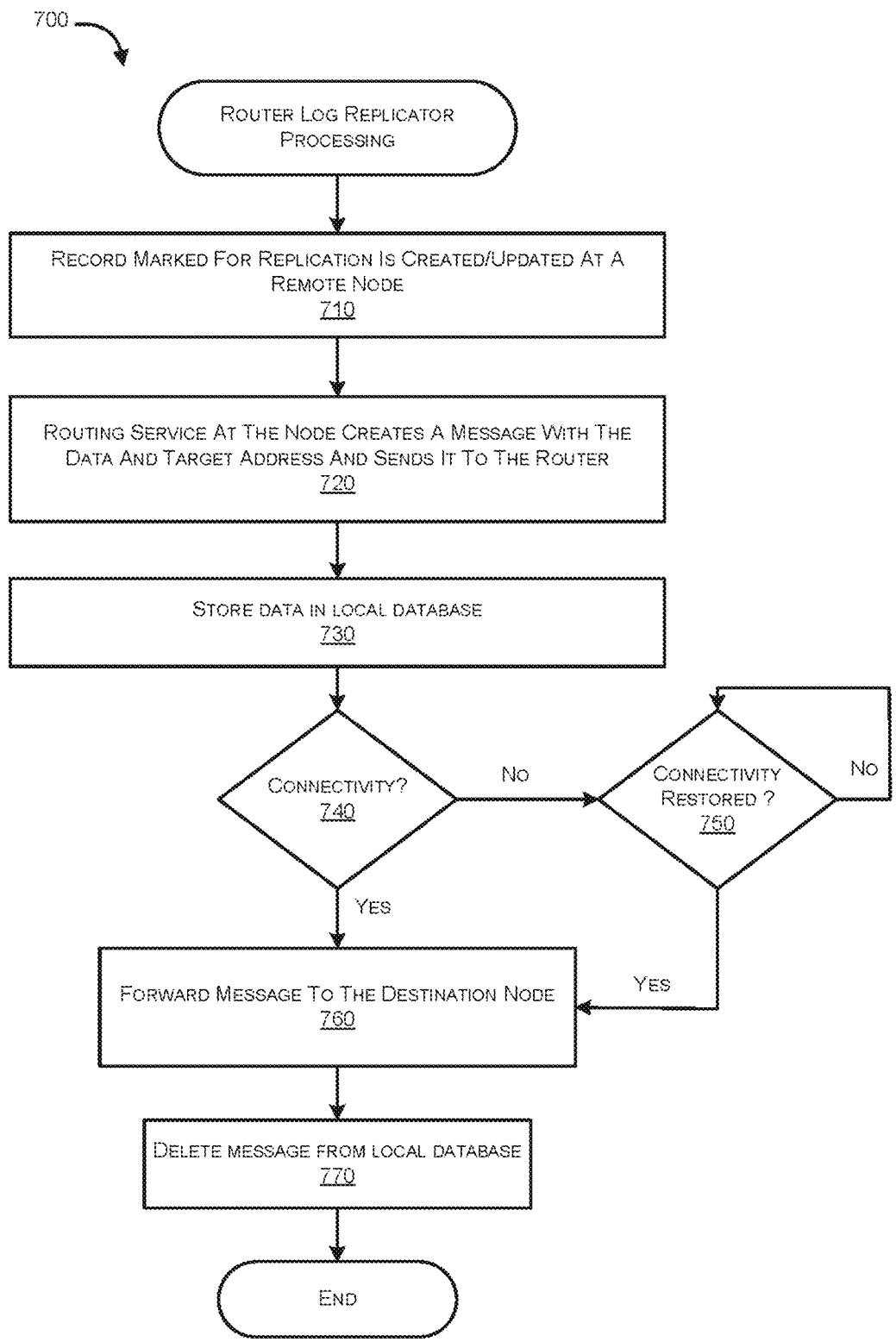
FIG. 7 is a flow diagram illustrating router log replicator processing in accordance with an embodiment of the present disclosure.

FIG. 7 is a flow diagram 700 illustrating router log replicator processing in accordance with an embodiment of the present disclosure. In the context of the present example, a local log replicator located at a secure router continues to aggregate log data in an event of connectivity disruption between the secure router and any of a plurality SOAR nodes. A local database at the secure router is used in accordance with an embodiment for ensuring guaranteed delivery of messages to a destination node.

At block 710, a record marked for replication is created/updated at a remote node (e.g., the remote node may be any of a child SOAR node or a parent SOAR node)

At block 720, when a record eligible for auto-replication is created or updated at either the child or parent SOAR node, a routing service running within the node creates a message with data to be replicated and an address of the destination node and posts the message to the secure router. When the remote node is the child SOAR node then the destination node may be the parent SOAR node or subsequent connected child SOAR node in next tier. Alternatively, when the remote node is the parent SOAR node, then the destination node may be the child SOAR node.

At block 730, the data is stored in a local database within the secure router. For example, whenever a replication message arrives at the secure router with an address of the destination, the secure router puts it in a message queue of the destination node.

At decision block 740, it is determined if there is connectivity from the secure router to the destination node. If so, then processing continues with block 670; otherwise, processing branches to decision block 750. For example, if the destination node is not connected to the secure router at the time the message arrives, the message is persisted locally so that it is available for consumption as soon as the destination node comes online. Hence, the secure router first stores a copy of each message into a local database at block 730.

At decision block 750, it is determined if connectivity has been restored. If so, then processing continues with block 760; otherwise processing loops back to decision block 750.

At block 760, the message is forwarded to the destination node. For example, responsive to connectivity being restored between the secure router and the destination node, the message is pulled from the message queue associated with the destination node and transmitted to the destination node.

At block 770, the message is deleted from the local database.

Figure 8:
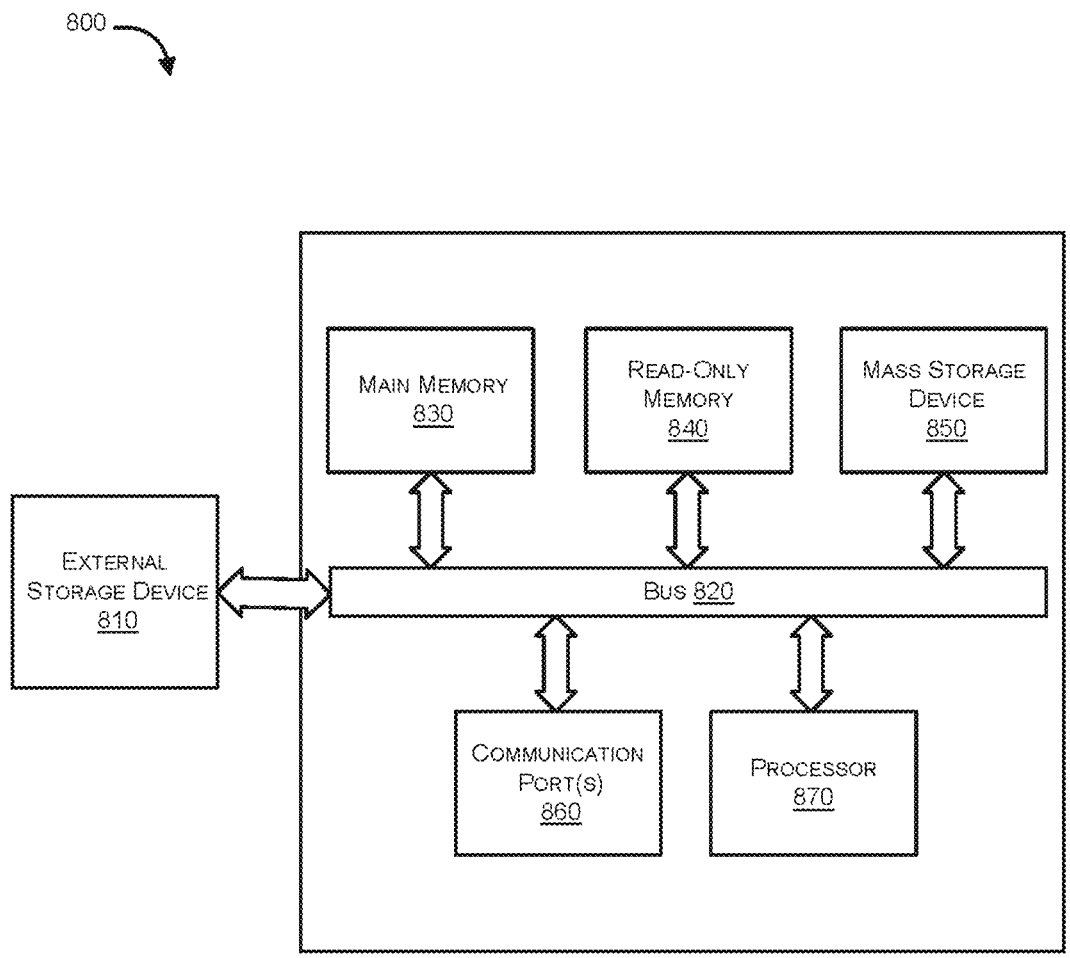
FIG. 8 illustrates an example computer system in which or with which embodiments of the present disclosure may be utilized.

FIG. 8 illustrates an exemplary computer system 800 in which or with which embodiments of the present disclosure may be utilized. As shown in FIG. 8, computer system includes an external storage device 810, a bus 820, a main memory 830, a read only memory 840, a mass storage device 850, a communication port 860, and a processing resource (e.g., processor 870). In one embodiment, computer system 800 may represent some portion of a SOAR node (e.g., master SOAR node 104, first tenant SOAR node 110, or second tenant SOAR node 122).

Those skilled in the art will appreciate that computer system 800 may include more than one processor 870 and communication ports 860. Non-limiting examples of processor 870 include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 870 may include various modules associated with embodiments of the present disclosure.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While embodiments of the present disclosure have been illustrated and described, it will be clear that the disclosure is not limited to these embodiments. Numerous modifications, changes, variations, substitutions, and equivalents will be apparent to those skilled in the art, without departing from the spirit and scope of the disclosure, as described in the claims.

Thus, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the disclosure, other and further embodiments of the disclosure may be devised without departing from the basic scope thereof. The scope of the disclosure is determined by the claims that follow. The disclosure is not limited to the described embodiments, versions or examples, which are included to enable a person having ordinary skill in the art to make and use the disclosure when combined with information and knowledge available to the person having ordinary skill in the art.

What is claimed is:

1. A method performed by a processing resource of a Secure Orchestration and Automated Response (SOAR) node of a hierarchy of a plurality SOAR nodes of a SOAR deployment, the method comprising:
controlling data flow propagation within the hierarchy, wherein the hierarchy includes a plurality of tiers, wherein each particular SOAR node of the plurality of SOAR nodes has a tenant identifier (ID) that uniquely identifies the particular SOAR node within the SOAR deployment, and wherein said controlling includes:
responsive to creation of a record by the SOAR node:
when there exists a parent tier of the plurality of tiers immediately above the SOAR node in the hierarchy, setting a parent-tenant ID (PID) of the record to the tenant ID of a parent SOAR node of the plurality of SOAR nodes associated with the parent tier; otherwise, setting the PID to the tenant ID of the SOAR node;
when there exists a child tier of the plurality of tiers immediately below the SOAR node in the hierarchy, setting a child-tenant ID (CID) of the record to the tenant ID of a child SOAR node of the plurality of SOAR nodes associated with the child tier; otherwise, setting the CID to the tenant ID of the SOAR node; and
maintaining a set of propagation rules for the SOAR node relating to permissibility of propagation of the record within the hierarchy; and
during propagation of the record by the SOAR node, updating the PID and the CID of the record.

2. The method of claim 1, wherein the plurality of tiers comprise:
a first tier representing a master managed security service provider (MSSP) and including a master SOAR node;
a second tier with which a first tenant of the SOAR deployment is associated and including a first tenant SOAR node; and
a third tier with which a second tenant of the SOAR deployment is associated and including a second tenant SOAR node, wherein the master SOAR node is a parent of the first tenant SOAR node and the first tenant SOAR node is a parent of the second tenant SOAR node.

3. The method of claim 2, wherein the first tenant comprises an MSSP operating as a reseller of services provided by the SOAR deployment and wherein the second tenant is a customer of the MSSP.

4. The method of claim 2, wherein the first tenant comprises a first site of a distributed Security Operations Center (SOC) of a customer of the master MSSP and the second tenant comprises a second site of the distributed SOC.

5. The method of claim 1, wherein the record contains incident data and the method further comprises selectively propagating the record downward through the hierarchy until the CID of the record is equal to the tenant ID of a recipient SOAR node of the plurality of SOAR nodes of the record or until a set of propagation rules for the recipient SOAR node prohibits said propagating.

6. The method of claim 1, wherein during upward propagation of the record by the SOAR node to the parent SOAR node:
setting the CID of the record to the tenant ID of the SOAR node; and
when there exists a further parent tier of the plurality of tiers immediately above the parent SOAR node in the hierarchy, setting the PID to the tenant ID of a further parent SOAR node of the plurality of SOAR nodes associated with the further parent tier; otherwise, setting the PID to the tenant ID of the parent SOAR node.

7. The method of claim 1, wherein during downward propagation of the record by the SOAR node to the child SOAR node:
setting the PID of the record to the tenant ID of the SOAR node; and
when there exists a further child tier of the plurality of tiers immediately below the child SOAR node in the hierarchy, setting the CID to the tenant ID of a further child SOAR node of the plurality of SOAR nodes associated with the further child tier; otherwise, setting the CID to the tenant ID of the parent SOAR node.

8. A Secure Orchestration and Automated Response (SOAR) node of a hierarchy of a plurality SOAR nodes of a SOAR deployment, the SOAR node comprising:
a processing resource; and
a non-transitory computer-readable medium, coupled to the processing resource, having stored therein instructions that when executed by the processing resource cause the processing resource to perform a method comprising:
controlling data flow propagation within the hierarchy, wherein the hierarchy includes a plurality of tiers, wherein each particular SOAR node of the plurality of SOAR nodes has a tenant identifier (ID) that uniquely identifies the particular SOAR node within the SOAR deployment, and wherein said controlling includes:
responsive to creation of a record by the SOAR node:

when there exists a parent tier of the plurality of tiers immediately above the SOAR node in the hierarchy, setting a parent-tenant ID (PID) of the record to the tenant ID of a parent SOAR node of the plurality of SOAR nodes associated with the parent tier; otherwise, setting the PID to the tenant ID of the SOAR node;

when there exists a child tier of the plurality of tiers immediately below the SOAR node in the hierarchy, setting a child-tenant ID (CID) of the record to the tenant ID of a child SOAR node of the plurality of SOAR nodes associated with the child tier; otherwise, setting the CID to the tenant ID of the SOAR node; and maintaining a set of propagation rules for the SOAR node relating to permissibility of propagation of the record within the hierarchy; and during propagation of the record by the SOAR node, updating the PID and the CID of the record.

9. The SOAR node of claim 8, wherein the plurality of tiers comprise:
a first tier representing a master managed security service provider (MSSP) and including a master SOAR node;
a second tier with which a first tenant of the SOAR deployment is associated and including a first tenant SOAR node; and
a third tier with which a second tenant of the SOAR deployment is associated and including a second tenant SOAR node, wherein the master SOAR node is a parent of the first tenant SOAR node and the first tenant SOAR node is a parent of the second tenant SOAR node.

10. The SOAR node of claim 9, wherein the first tenant comprises an MSSP operating as a reseller of services provided by the SOAR deployment and wherein the second tenant is a customer of the MSSP.

11. The SOAR node of claim 9, wherein the first tenant comprises a first site of a distributed Security Operations Center (SOC) of a customer of the master MSSP and the second tenant comprises a second site of the distributed SOC.

12. The SOAR node of claim 8, wherein the record contains incident data and the method further comprises selectively propagating the record downward through the hierarchy until the CID of the record is equal to the tenant ID of a recipient SOAR node of the plurality of SOAR nodes of the record or until a set of propagation rules for the recipient SOAR node prohibits said propagating.

13. The SOAR node of claim 8, wherein during upward propagation of the record by the SOAR node to the parent SOAR node:
setting the CID of the record to the tenant ID of the SOAR node; and
when there exists a further parent tier of the plurality of tiers immediately above the parent SOAR node in the hierarchy, setting the PID to the tenant ID of a further parent SOAR node of the plurality of SOAR nodes associated with the further parent tier; otherwise, setting the PID to the tenant ID of the parent SOAR node.

14. The SOAR node of claim 8, wherein during downward propagation of the record by the SOAR node to the child SOAR node:
setting the PID of the record to the tenant ID of the SOAR node; and
when there exists a further child tier of the plurality of tiers immediately below the child SOAR node in the hierarchy, setting the CID to the tenant ID of a further child SOAR node of the plurality of SOAR nodes associated with the further child tier; otherwise, setting the CID to the tenant ID of the parent SOAR node.

15. A non-transitory computer-readable storage medium embodying a set of instructions, which, when executed by a processing resource of a Secure Orchestration and Automated Response (SOAR) node of a hierarchy of a plurality SOAR nodes of a SOAR deployment, causes the processing resource to perform a method comprising:
controlling data flow propagation within the hierarchy, wherein the hierarchy includes a plurality of tiers, wherein each particular SOAR node of the plurality of SOAR nodes has a tenant identifier (ID) that uniquely identifies the particular SOAR node within the SOAR deployment, and wherein said controlling includes:
responsive to creation of a record by the SOAR node:
when there exists a parent tier of the plurality of tiers immediately above the SOAR node in the hierarchy, setting a parent-tenant ID (PID) of the record to the tenant ID of a parent SOAR node of the plurality of SOAR nodes associated with the parent tier; otherwise, setting the PID to the tenant ID of the SOAR node;
when there exists a child tier of the plurality of tiers immediately below the SOAR node in the hierarchy, setting a child-tenant ID (CID) of the record to the tenant ID of a child SOAR node of the plurality of SOAR nodes associated with the child tier; otherwise, setting the CID to the tenant ID of the SOAR node; and
maintaining a set of propagation rules for the SOAR node relating to permissibility of propagation of the record within the hierarchy; and
during propagation of the record by the SOAR node, updating the PID and the CID of the record.

16. The non-transitory computer-readable storage medium of claim 15, wherein the plurality of tiers comprise:
a first tier representing a master managed security service provider (MSSP) and including a master SOAR node;
a second tier with which a first tenant of the SOAR deployment is associated and including a first tenant SOAR node; and
a third tier with which a second tenant of the SOAR deployment is associated and including a second tenant SOAR node, wherein the master SOAR node is a parent of the first tenant SOAR node and the first tenant SOAR node is a parent of the second tenant SOAR node.

17. The non-transitory computer-readable storage medium of claim 16, wherein the first tenant comprises an MSSP operating as a reseller of services provided by the SOAR deployment and wherein the second tenant is a customer of the MSSP.

18. The non-transitory computer-readable storage medium of claim 16, wherein the first tenant comprises a first site of a distributed Security Operations Center (SOC) of a customer of the master MSSP and the second tenant comprises a second site of the distributed SOC.

19. The non-transitory computer-readable storage medium of claim 15, wherein the record contains incident data and the method further comprises selectively propagating the record downward through the hierarchy until the CID of the record is equal to the tenant ID of a recipient SOAR node of the plurality of SOAR nodes of the record or until a set of propagation rules for the recipient SOAR node prohibits said propagating.

20. The non-transitory computer-readable storage medium of claim 15, wherein during upward propagation of the record by the SOAR node to the parent SOAR node:

setting the CID of the record to the tenant ID of the SOAR node; and when there exists a further parent tier of the plurality of tiers immediately above the parent SOAR node in the hierarchy, setting the PID to the tenant ID of a further parent SOAR node of the plurality of SOAR nodes associated with the further parent tier; otherwise, setting the PID to the tenant ID of the parent SOAR node.

21. The non-transitory computer-readable storage medium of claim 15, wherein during downward propagation of the record by the SOAR node to the child SOAR node:

setting the PID of the record to the tenant ID of the SOAR node; and when there exists a further child tier of the plurality of tiers immediately below the child SOAR node in the hierarchy, setting the CID to the tenant ID of a further child SOAR node of the plurality of SOAR nodes associated with the further child tier; otherwise, setting the CID to the tenant ID of the parent SOAR node.

\* \* \* \* \*